United States Patent [19]
Estabrook et al.

[11] Patent Number: 4,846,545
[45] Date of Patent: Jul. 11, 1989

[54] FIBER OPTIC CABLE SPLICE

[75] Inventors: Andrew R. Estabrook; Laura A. Shook, both of San Diego, Calif.; Gerard N. Daguio, Mililani Town; Robert M. Baker, Honolulu, both of Hi.

[73] Assignee: The United States of America as represented by the Secretary of the Navy, Washington, D.C.

[21] Appl. No.: 182,289

[22] Filed: Mar. 30, 1988

[51] Int. Cl.⁴ .............................................. G02B 6/38
[52] U.S. Cl. ................................ 350/96.21; 350/96.23
[58] Field of Search ............... 350/96.20, 96.21, 96.22, 350/96.23

[56] References Cited

U.S. PATENT DOCUMENTS

| | | | |
|---|---|---|---|
| 4,348,076 | 9/1982 | Oldham | 350/96.22 |
| 4,509,820 | 4/1985 | Murata et al. | 350/96.21 |
| 4,516,830 | 5/1985 | Guazzo | 350/96.22 |
| 4,545,645 | 10/1985 | Mignien | 350/96.21 |
| 4,595,256 | 6/1986 | Guazzo | 350/96.21 |
| 4,601,536 | 7/1986 | Guazzo | 350/96.20 |
| 4,632,507 | 12/1986 | Mignien et al. | 350/96.23 |
| 4,657,343 | 4/1987 | Oldham et al. | 350/96.23 |
| 4,733,935 | 3/1988 | Gandy | 350/96.21 |

FOREIGN PATENT DOCUMENTS

| | | | |
|---|---|---|---|
| 3011429 | 10/1981 | Fed. Rep. of Germany | 350/96.20 |
| 57-78011 | 5/1982 | Japan | 350/96.20 |
| 2162656 | 2/1986 | United Kingdom | 350/96.20 |

*Primary Examiner*—John D. Lee
*Attorney, Agent, or Firm*—Harvey Fendelman; Thomas Glenn Keough; Peter A. Lipovsky

[57] ABSTRACT

An apparatus that joins ends of fiber optic cables includes a fiber protection sleeve fitted over an area of optical coupling to cover bare optical fibers at the coupling. The sleeve extends from the bare fibers to cover a portion of a buffer section of each cable. The fiber protection sleeve has an inner heat shrinkable tube that overlaps the area of optical coupling, a flexure suppressant rigidity member disposed exteriorly adjacent the inner heat shrinkable tube, and an outer heat shrinkable tube that overlaps the rigidity member and the inner heat shrinkable tube. The inner and outer heat shrinkable tubes are shrink-fitted to strengthen and seal the area of optical coupling. Additionally, a strength member sleeve is fitted over cable strength member sections that are interlayed over the fiber protection sleeve. The strength member sleeve includes a solder impregnated tubular braid and a heat shrinkable tube covering the braid. Heating the strength member sleeve causes solder within the braid to join the braid with the interlayed strength members, and causes the heat shrinkable tube surrounding the tubular braid to shrink the braid and itself upon the interlayed strength members. An encapsulant lined outer protective heat shrinkable sheath overlaps the other elements of the invention and extends onto a portion of the sheath of each cable. The outer protective sheath is heat shrunk to seal the area of optical coupling from the ambient and to distribute the encapsulant throughout the sheath to further seal the area of optical coupling.

16 Claims, 3 Drawing Sheets

FIBER OPTIC CABLE CONNECTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to the field of communication. The invention relates more specifically to communication made by fiber optic link. In greater specificity, but without limitation thereto, the invention relates to an apparatus for joining the ends of two fiber optic cables.

Exceedingly greater demands for fiber optics have brought this technology to the ocean floor. These demands require that open expanses of water be traversed by fiber optic links. Though these ocean expanses are often of great depth and lateral dimension, commercially available optical fiber is currently limited to lengths of about 10,000 meters or less. As a result, it has been found necessary to interconnect these spans of fiber.

In the past, an apparatus known as a dry-mate connector assembly has been used for this purpose. The dry-mate connector assembly, otherwise known as the DCA, surrounds an optical fiber interconnection, and is attached to a cable housing that traditionally surrounds the fiber. The DCA consists of a universal termination on each cable end, a dry-mate connector section and a pressure compensating oil filled housing. The DCA, as used for a fiber cable of roughly 1/10th an inch in diameter, measures 3 inches in diameter by 25 inches long. Further, a completed DCA of this type weighs approximately 9 pounds. Fabrication and assembly of the DCA requires approximately three working days, at the present cost of several thousand dollars.

The need for a relatively less costly, weighty and bulky connector assembly thus became apparent. With the potential deployment of a great many of these assemblies, cost efficiency is an important consideration. Weight and size limitations must i also be dealt with, as these are critical to effective use of interconnected optical fiber cables. This is because cumbersome connectors of large weight and size can disrupt cable deployment apparatuses or can prove unworkable with conventional optical cable storage devices.

SUMMARY OF THE INVENTION

The present invention is utilized with a conventional optical fiber having a cable exterior consisting of a buffer section covering the optical fiber, a strength member section covering the buffer section and a sheath covering the strength member section. The invention includes an inner barrier that encloses the optical fibers where they are optically coupled together and which extends therefrom onto a portion of the buffer section of each cable. The inner barrier engages the optically coupled fibers and the buffer sections to seal the area of optical coupling from the ambient. A rigidity member is disposed exteriorly adjacent the inner barrier to strengthen the area of optical coupling from extensive flexure. The invention further includes a strength member connector that overlaps the area of optical coupling to mechanically join the strength member sections of each cable. The strength member connector provides a mechanical continuity between the connected cables and ensures that tensile loadings in the cables are not transmitted to the interconnected fibers. An outer protective barrier next is disposed to cover the strength member connector, rigidity member, and inner barrier and extends onto a portion of the sheaths of each cable. The outer barrier further seals the area of optical coupling from the ambient.

OBJECTS OF THE INVENTION

An object of the invention is to provide an apparatus for joining the ends of two fiber optic cables.

Another object of the invention is to provide an apparatus for joining the ends of two fiber optic cables that protects the area of optical coupling.

Another object of the invention is to provide an apparatus for joining the ends of two fiber optic cables that is relatively small, lightweight, and is easy and inexpensive to produce.

Still another object of the invention is to provide an apparatus for joining the ends of two fiber optic cables that seals the area of optical coupling from the extreme hydrostatic pressures encountered on ocean floors.

Still another object of the invention is to provide an apparatus for joining the ends of two fiber optic cables that mechanically joins the cables so that tensile loadings applied thereto are not transmitted to the optical coupling.

Still yet a further object of the invention is to provide an apparatus for joining the ends of two fiber optic cables that has flexure characteristics compatible with the cables joined.

Still yet another object of the invention is to provide an apparatus for joining the ends of two fiber optic cables that is diametrically similar to the cables joined.

Yet a further object of the invention is to provide an apparatus for joining the ends of two fiber optic cables that is smoothly deployable by conventional optical cable deployment apparatuses.

A further object of the invention is to provide an apparatus for joining the ends of two fiber optic cables that is compatible with conventional optical cable storage devices.

These and other objects of the invention will become more readily apparent from the ensuing specification when taken with the language of the appended claims in conjunction with the attached drawings.

DESCRIPTION OF THE PREFERRED EMBODIMENT

Figure 1:
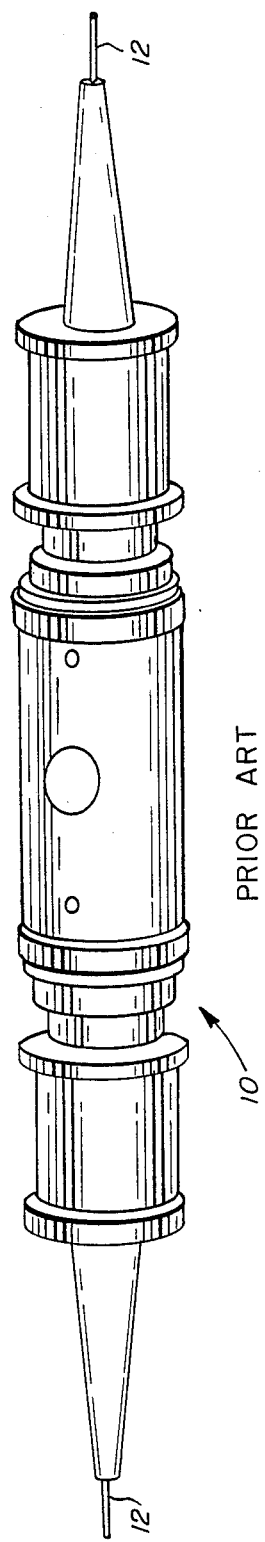
FIG. 1 is a fiber optic cable connector of the prior art.

In FIG. 1 there is shown a prior art fiber optic cable connector 10 known as the dry-mate connector assembly (DCA). As mentioned above, the DCA used to join optical cables 12 of approximately 1/10th of an inch in diameter is a relatively heavy, bulky device weighing about 9 pounds and measuring approximately 3 inches in diameter by 25 inches long. Additionally, this DCA is a relatively inflexible connector.

Figure 2:
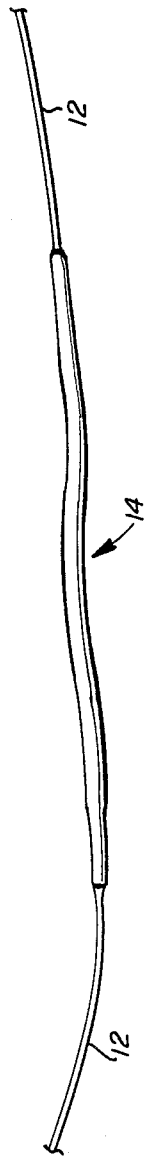
FIG. 2 is a lateral view of an apparatus for joining the ends of two fiber optic cables according to the invention.

Referring to FIG. 2, a like scale illustration of a cable connector apparatus 14 joins the ends of two fiber optic cables 12. As is apparent, apparatus 14 more closely approaches the physical dimensions and characteristics of the cables.

Referring to FIG. 3, views A through E show progressively the construction of the present invention. Each fiber optic cable 12, shown individually in FIG. 4, has an optical fiber 16 surrounded by a buffer section 18 which is, in turn, surrounded by a strength member section 20. Strength member section 20 incorporated metallic strands, helically served about buffer 18. Alternatively, these strands could be laid linearly parallel as is shown in FIGS. 3A through 3D, and could be made of non-metallic substances. Strength member section 20 gives tensile strength to cable 12 while providing armoring for optical fiber 16. An outer protective sheath 22 surrounds strength member 20.

Figure 3A:
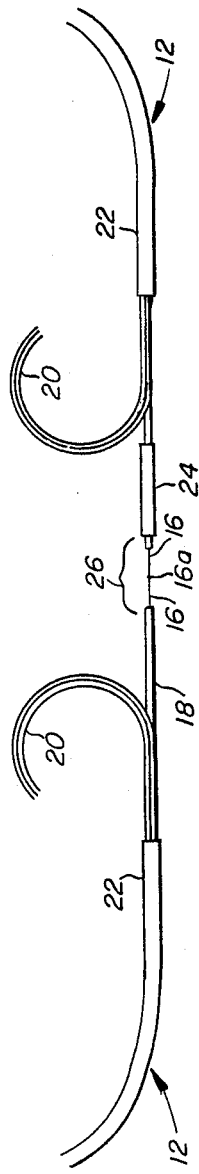
FIGS. 3A-3E illustrate stages of construction of the present invention.
Figure 4:
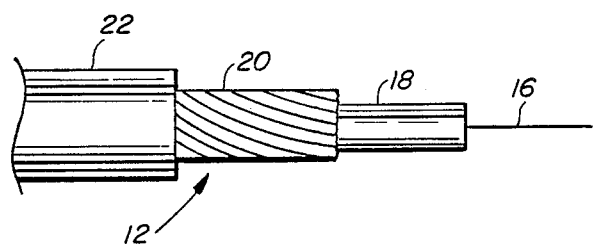
FIG. 4 is a detailed view of a representative fiber optic cable.

FIG. 3A shows a first stage in the construction of the present invention. Preparation of to-be-joined cables 12 consists of stripping and cutting each cable to leave a length of bare buffer section 18 terminating in a bare optical fiber 16. Fiber 16 and buffer 18 of each cable 12 are cut short so that strength member 20 extends beyond the bare fiber and bare buffer sections. A suitable length of both outer protective sheaths 22 is removed and strength members 20 are peeled back away from the axis of cables 12. Before optical fibers 16 of cables 12 are joined, certain tubular members are placed over the ends of cables 12. This time of placing of these certain tubular members is advantageous where the to-be-joined cables are great in length. However, whether these tubular members are first slid over the cables before the optical fiber coupling is made or thereafter is within the discretion of those skilled in the art. Both optical fibers 16 are then optically coupled together at a point or area 16a. Apparatuses for performing optical fiber coupling or fusion "splicing", as is known in the art, are available from commercial sources, such as Power Technology or Sumitomo.

Figure 3B:
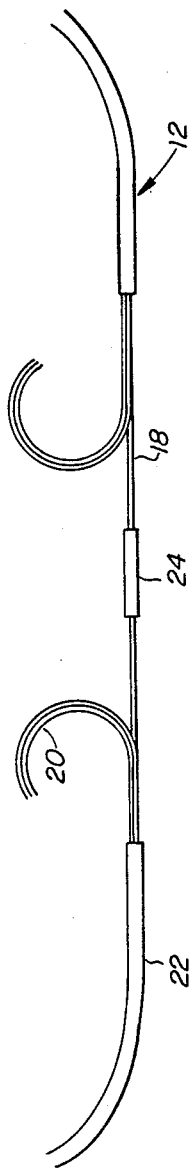
Figure 5:
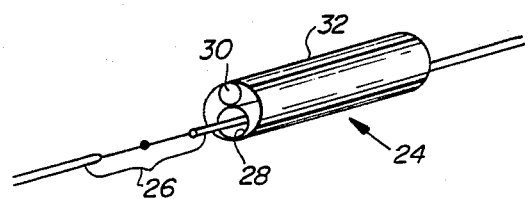
FIG. 5 is a detailed view of a portion of FIG. 3A.

Referring now to FIGS. 3A, 3B and 5, the latter being a detailed view of a portion of FIG. 3A, a fiber protection sleeve 24 is located over the joined fiber ends. The fiber protection sleeve is fitted over an area of optical coupling 26 and covers bare optical fibers 16 at optical coupling 16a and extends from the optical coupling onto at least a portion of bare buffer section 18 of each cable 12. Fiber protection sleeve 24 has an inner, void filling, heat shrinkable tube or barrier 28; a flexure suppressant rigidity member 30 disposed exteriorly alongside; and an outer heat shrinkable tube 32 encircling rigidity member 30 and inner tube 28. Rigidity member 30 prevents excessive flexure of the joined fibers at the area of optical coupling so that these fibers are not flexed beyond their design limits, yet permits these fibers to flex in harmony with the joined optical cables 12. When a sufficient amount of heat is applied convectionally to sleeve 24 by a conventional heat source, inner tube 28 shrinks in a sealing relationship upon the coupled optical fibers 16 at the area of optical coupling 26 to seal this area from the ambient. In addition, outer heat shrinkable tube 32 shrinks upon rigidity member 30 and inner tube 28 to bondedly adhere them together and to further seal the area of optical coupling 26 from the ambient.

In prototypes of the invention, inner tube 28 was ethylene vinyl acetate, having shrinkable as well as void filling characteristics. Inner tube 28 closely adheres to the optical fibers 16 and buffers 18 to seal and fill any voids, thereby preventing optical fibers 16 from microbending when subjected to extreme pressures in the ambient, like those that may be encountered undersea. Such microbends would adversely affect the quality of the communication signals sent over the optical fibers. Additionally, prototypes of outer tube 32 were fabricated of polyethylene, having strength as well as sealing characteristics. It should be noted that the named compositions of inner and outer tubes, 28 and 32, respectively, are not essential to the invention, providing that these tubes have suitable sealing and strength capabilities.

Figure 3C:

Referring to FIG. 3C, the over-extending strength member sections 20 of each cable 12 are interlayed over at least the area of optical coupling 26. A binding wire 34 can be used to retain interlayed strength members 20 in place.

Figure 3D:
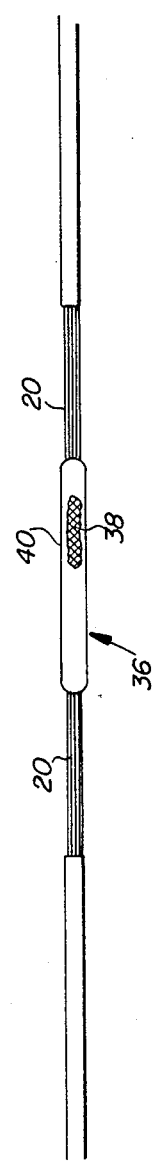

Referring now to FIG. 3D, a strength member sleeve 36 is shown fitted over the interlayed strength members 20. Strength member sleeve 36 has a tubular metallic braid or fabric 38 impregnated with a low melting temperature solder adhesive. The strength member sleeve includes a heat shrinkable tube 40 that covers the solder-impregnated tubular braid 38. A suitable heat source is brought near the strength member sleeve and the solder carried on the solder-impregnated tubular braid is melted and flows throughout the braid and overlapped strength members. Removal of the heat source causes the solder to solidify and join the braid and interlayed strength members together. Application of the heat simultaneously shrinks heat shrinkable tube 40. This has the effect of pulling the melted solder-impregnated braid 38 and overlapped strength members 20, together in a tight package. Optionally, an adhesive such as a polymer resin can be included in place of the solder to bond strength members of metallic or synthetic fibers together when the fiber optic cables include these fibers. In this manner, strength member sleeve 36 mechanically joins the fiber optic cables together and gives the area of optical coupling 26 sufficient tensile strength.

Figure 3E:
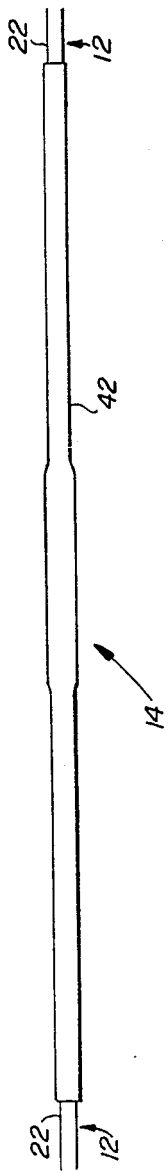

FIG. 3E, shows the final portion for joining the ends of two fiber optic cables 12. An outer protective heat shrinkable sheath or barrier 42 overlaps the aforementioned elements of the invention and extends therefrom onto at least a portion of the sheath 22 of each cable 12. The outer protective heat shrinkable sheath is encapsulant lined, so that upon the application of sufficient convective heat, it shrinks and the encapsulant is distributed throughout the sheath to jointly further substantially seal the area of optical coupling 26 from the ambient. Outer protective sheath 42 has been made of encapsulant lined selectively cross-linked polyolefin. However, those skilled in the art can select an outer sheath from a variety of compositions, provided that the sheath has suitable sealing and strength characteristics.

A relatively small, lightweight, inexpensive and easily assembled apparatus for joining the ends of two submersible fiber optic cables is provided by the present invention. This apparatus is designed to withstand hydrostatic pressure of up to about 10,000 pounds per square inch and tensile loadings of about 200 pounds. The invention has flexure characteristics closely resembling the fiber optic cables joined, and has a diametrical dimension no greater than 4 times that of the joined cables. These features make deployment of cables joined by the apparatus of the invention a smooth process, as the interconnected cables will not become snagged upon fiber storage devices or fiber payout devices.

Obviously, many modifications and variations of the present invention are possible in the light of the above teachings. It is therefore to be understood that within the scope of the appended claims, the invention may be practiced otherwise than as specifically described.

We claim:

1. An apparatus for joining the ends of two fiber optic cables, each cable having an optical fiber, a buffer section covering the optical fiber, a strength member section covering the buffer section and a sheath covering the strength member section, the optical fiber of each cable being optically coupled together comprising:
   inner barrier means enclosing the optical fibers where they are optically coupled and extending therefrom onto a portion of the buffer section of each cable for sealing the area of optical coupling from the ambient;
   means mounted externally adjacent said inner barrier means for strengthening the area of optical coupling from excessive flexure;
   means for encircling the inner barrier means and the strengthening means for drawing them together in a contiguous relationship to further strengthen and seal the area of optical coupling;
   means connnected to the strength member section of each of the fiber optic cables for mechanically joining the fiber optic cables together, the mechanical joining means including a fabric mesh impregnated with adhesive, said mesh overlapping the area of optical coupling; and
   outer barrier means disposed to cover the mechanical joining means, strengthening means and inner barrier means, and extending therefrom onto a portion of the sheaths of each cable for further sealing the area of optical coupling from the ambient;
   the width of the apparatus being no greater than four times the width of the cables joined.

2. An apparatus for joining the ends of two fiber optic cables, each cable having an optical fiber, a buffer section covering the optical fiber, a strength member section covering the buffer section and a sheath covering the strength member section, the optical fiber of each cable being optically coupled together in an optical coupling comprising:
   an inner heat shrinkable tube covering the optical coupling and extending therefrom onto at least a portion of the buffer section of each cable, said inner tube being shrink-fitted under sufficient heat so that the area of optical coupling is substantially sealed from the ambient and so that any voids between the inner tube and the area of optical coupling are substantially filled;
   a rigidity member disposed exteriorly adjacent the inner heat shrinkable tube;
   an outer heat shrinkable tube covering the rigidity member and inner heat shrinkable tube, the outer tube being shrink-fitted under sufficient heat to bind the rigidity member to the inner heat shrinkable tube and to further substantially seal the area of optical coupling from the ambient;
   a meshed strength member connector disposed exteriorly adjacent the outer heat shrinkable tube and mechanically joined to the strength member sections of each cable; and
   an outer protective heat shrinkable sheath longitudinally covering the strength member connector and extending therefrom onto at least a portion of the sheath of each cable, the outer protective sheath being shrink-fitted under sufficient heat to further substantially seal the area of optical coupling from the ambient.

3. An apparatus for joining the ends of the two fiber optic cables as set forth in claim 2 in which the meshed strength member connector is a fabric impregnated with an adhesive.

4. An apparatus for joining the ends of two fiber optic cables as set forth in claim 3 in which the strength member sections are metallic and the strength member connector is a solder-impregnated braid bonded to the metallic strength member section of each cable by the application of sufficient heat.

5. An apparatus for joining the ends of two fiber optic cables as set forth in claim 4 in which the rigidity member is a rod having a length extending across the area of optical coupling.

6. An apparatus for joining the ends of two fiber optic cables, each cable having an optical fiber optically coupled to each other in an optical coupling, a buffer section longitudinally covering the fiber of each cable, a strength member section covering each buffer section, and a sheath covering each strength member section, the cable ends being stripped and cut to leave a length of bare buffer section terminating in bare optical fiber at the optical coupling, with the strength member section of each cable extending longitudinally beyond the optical coupling, the apparatus comprising:
   a fiber protection sleeve covering the bare optical fibers at the optical coupling and extending therefrom onto at least a portion of the bare buffer sections of each cable end, the fiber protection sleeve being characterized by having;
   an inner heat shrinkable tube overlapping the area of optical coupling, the inner tube being shrink-fitted under sufficient heat so that the area of optical coupling is substantially sealed from the ambient and so that any voids between the inner heat shrinkable tube and the area of optical coupling are substantially filled,
   a flexure-suppressant rigidity member disposed exteriorly adjacent the inner heat shrinkable tube, and
   an outer heat shrinkable tube covering the rigidity member and the inner heat shrinkable tube, and being shrink-fitted under sufficient heat to bind the rigidity member to the inner heat shrinkable tube and to further substantially seal the area of optical coupling;
   a strength member sleeve, the strength member section of each cable being interlayed over at least the area of optical coupling with the strength member sleeve being fitted over the interlayed strength member sections, the strength member sleeve being characterized by having;
   an adhesive impregnated fabric longitudinally disposed over the interlayed strength member sections and being bindingly adhered thereto, and a heat shrinkable tube covering the adhesive impregnated fabric, the heat shrinkable tube being shrink-fitted under sufficient heat to conform to the adhesive impregnated fabric and the interlayed strength member sections;

an outer protective heat shrinkable sheath covering the strength member sleeve and extending therefrom onto at least a portion of said sheath of each cable, where the outer protective heat shrinkable sheath being shrink-fitted under sufficient heat to bind upon the strength member sleeve and the portions of the sheath of each cable to further substantially seal the area of optical coupling from the ambient.

7. An apparatus for joining the ends of two fiber optic cables as set forth in claim 6 wherein the strength member sections are metallic and the adhesive impregnated fabric is solder-impregnated tubular braid bonded to the metallic strength member sections of each cable by the application of sufficient heat.

8. An apparatus for joining the ends of two fiber optic cables set forth in claim 6 wherein said flexure-suppressant rigidity member is a rod having a length extending across the area of optical coupling.

9. An apparatus for joining the ends of two fiber optic cables as set forth in claim 8 wherein the outer protective heat shrinkable sheath is lined interiorly with an encapsulant sealant, the sealant being sealingly distributed throughout the outer protective sheath upon the sheath shrinking under heat.

10. An apparatus for joining the ends of two fiber optic cables, each cable having an optical fiber optically coupled to each other in an optical coupling, a buffer section longitudinally covering the fiber of each cable, a multi-strand metallic strength member covering each buffer section, and a sheath covering each strength member, the cable ends being stripped and cut to leave a length of bare buffer section terminating in bare optical fiber at the optical coupling, with the strength member of each cable extending longitudinally beyond the optical coupling, the apparatus comprising:

an inner, void-filling heat shrinkable tube longitudinally covering the bare optical fibers at the optical coupling and extending therefrom onto at least a portion of the bare buffer sections of each cable, the inner tube being shrink-fitted under sufficient heat so that the area of optical coupling is substantially sealed from the ambient and so that any voids between the inner tube and the area of optical coupling are substantially filled;

a flexure-suppressant rigidity member disposed exteriorly adjacent the inner heat shrinkable tube;

an outer heat shrinkable tube covering the rigidity member and the inner heat shrinkable tube, the outer tube being shrink-fitted under sufficient heat to bind the rigidity member to the inner heat shrinkable tube and to further substantially seal the area of optical coupling from the ambient;

a solder-impregnated tubular braid, the multi-strand metallic strength member of each cable being interlayed over at least the area of optical coupling, the solder-impregnated tubular braid being longitudinally disposed over the interlayed strength members;

a heat shrinkable tube covering the solde-rimpregnated tubular braid, sufficient heat being directed upon the heat shrinkable tube to bindingly join the solder within the solder-impregnated tubular braid to the multi-strand strength members and to the braid, and to shrink-fit the heat shrinkable tube and the solder-impregnated tubular braid upon the interlayed strength members; and an encapsulant lined outer protective heat shrinkable sheath overlapping the heat shrinkable tube and extending therefrom onto at least a portion of said sheath of each cable, the encapsulant lined outer protective sheath being shrink-fitted under sufficient heat to substantially seal the area of optical coupling from the ambient and to distribute the encapsulant throughout the sheath to further substantially seal the area of optical coupling from the ambient.

11. An apparatus for joining the ends of two fiber optic cables, each cable having an optical fiber, a buffer section covering the optical fiber, a strength member section covering the buffer section and a sheath covering the strength member section, the optical fiber of each cable being optically coupled together comprising:

inner barrier means enclosing the optical fibers where they are optically coupled together and extending therefrom onto a portion of the buffer section of each cable for sealing the area of optical coupling from the ambient;

means mounted externally adjacent said inner barrier means for strengthening the area of optical coupling from excessive flexure;

means mounted externally adjacent said means for strengthening and connected to the strength member section of each of the fiber optic cables for mechanically joining the fiber optic cables together, the mechanical joining means including a mesh overlapping the area of optical coupling; and outer barrier means disposed to cover the mechanical joining means, strengthening means and inner barrier means, and extending therefrom onto a portion of the sheaths of each cable for further sealing the area of optical coupling from the ambient.

12. An apparatus for joining the ends of two fiber optic cables as set forth in claim 11 further including means encircling the inner barrier means and the strengthening means for drawing them together in a contiguous relationship to further strengthen and seal the area of optical coupling.

13. An apparatus for joining the ends of two fiber optic cables as set forth in claim 12 wherein the inner barrier means, the outer barrier means and the encircling means are heat shrinkable tubing shrink-fitted by the application of sufficient heat.

14. An apparatus for joining the ends of two fiber optic cables as set forth in claim 13 in which the mechanical joining means is a fabric impregnated with adhesive.

15. An apparatus for joining the ends of two fiber optic cables as set forth in claim 14 wherein the strength member sections are metallic and the mechanical joining means is a solder-impregnated tubular braid bonded to the strength member section of each cable by the application of sufficient heat.

16. An apparatus for joining the ends of two fiber optic cables as set forth in claim 15 in which the strengthening means is a rod having a length extending across the area of optical interconnection.

* * * * *